July 15, 1941.  J. W. DAWSON  2,248,968
ELECTRIC DISCHARGE APPARATUS
Filed Aug. 13, 1938   3 Sheets-Sheet 1
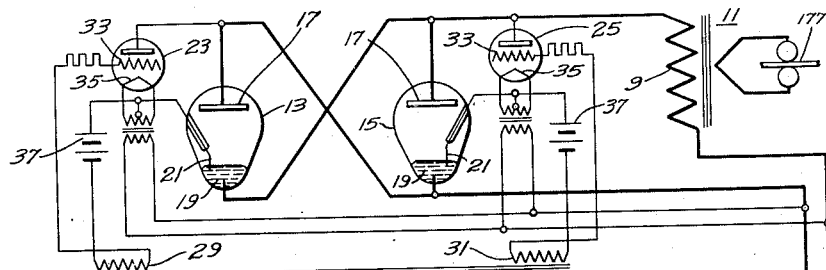
Fig.1.
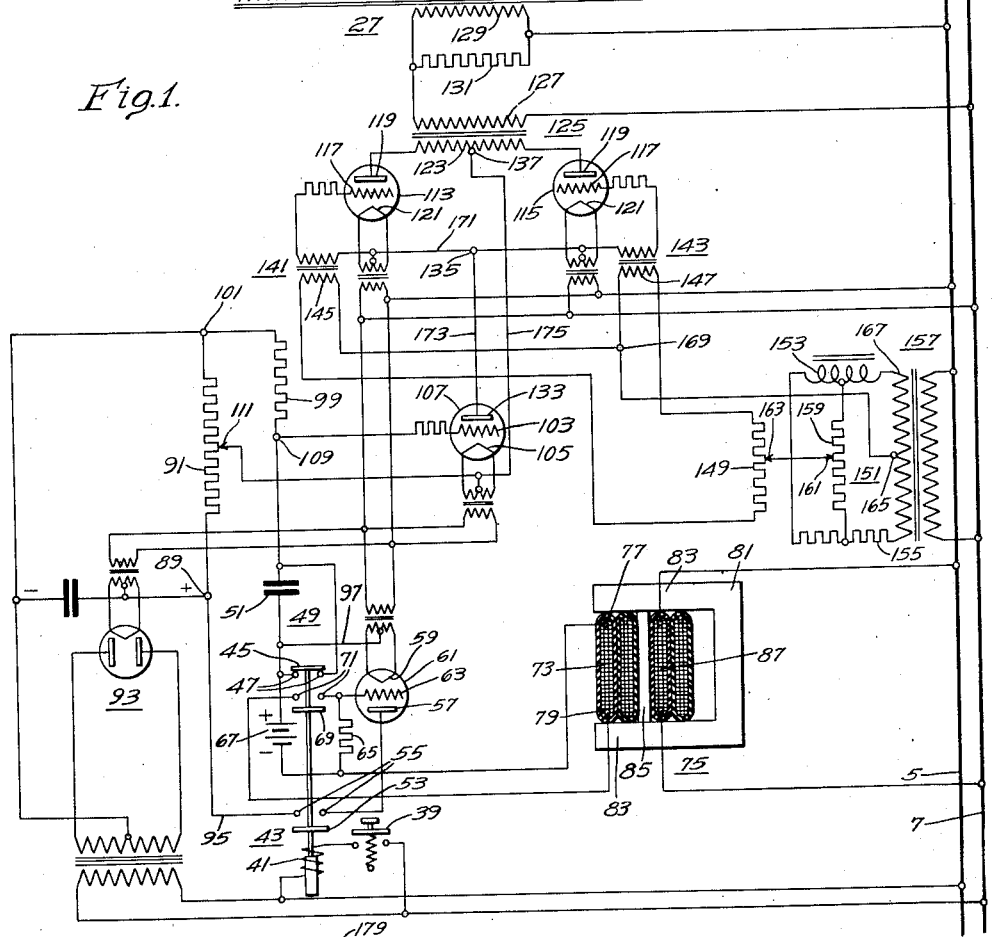
Fig.2.
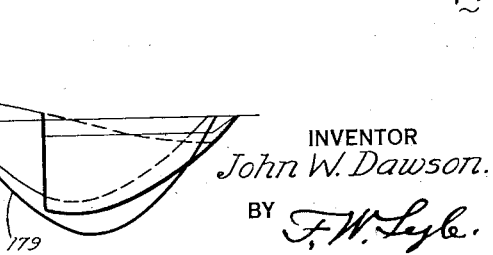
WITNESSES:
C. J. Weller
Hymen Diamond
INVENTOR
John W. Dawson.
BY F. W. Lyle
ATTORNEY Patented July 15, 1941

2,248,968

UNITED STATES PATENT OFFICE 2,248,968

ELECTRIC DISCHARGE APPARATUS

John W. Dawson, Auburndale, Mass., assignor to Westinghouse Electric & Manufacturing Company, East Pittsburgh, Pa., a corporation of Pennsylvania Application August 13, 1938, Serial No. 224,708

9 Claims. (Cl. 250—27)

My invention relates to electric discharge apparatus and has particular relation to control apparatus for electric discharge devices.

The invention is the outgrowth of certain improvements made by me in resistance spot and seam welding apparatus. In apparatus of this type intermittent welding impulses are supplied to the material to be welded. To control the magnitude and length of impulses electronic valve means is customarily interposed between the source and the welding load. Since the welding current required is of relatively large magnitudes, the valves used are capable of transmitting substantial current and commonly are of the mercury pool immersed ignition-electrode type.

The welding current is controlled in two respects; as to the time for which each impulse persists and as to the magnitude of the impulse. The former control is known in the art as the timing of the welding current and is ordinarily carried out by so controlling the valve means that it permits current to flow to the welding load during the desired number of periods of the source and blocks the current flow during intervening periods. The other adjustment which is imposed on the welding current is known in the art as heat control and is attained by initiating the flow of welding current at a particular instant in each of the periods during which it flows.

In apparatus constructed and operated in accordance with the teachings of the prior art of which I am aware, two auxiliary valves are used in the control circuit of each main valve for the purpose of attaining the timing and the heat control. Both of the auxiliary valves operate together to release the main valve. The conductivity of one of the auxiliary valves is controlled from a suitable timing device and the conductivity of the other valve from a suitable phase shift element.

Since the welding current required is relatively large and the main valve must, therefore, be capable of carrying considerable current, the associated timing and heat control auxiliary valves are also necessarily relatively large and therefore expensive. The above fact is particularly true where the welding current required is so large that the main valves are of the mercury pool immersed-ignition-electrode type. In this case the ignition current drawn by the main valves is large and although this current flows for only a short interval of time the auxiliary valves must be designed to withstand relatively high surge currents and therefore are expensive.

It is accordingly an object of my invention to provide a welding system having the features of timing and heat control in which the number of auxiliary valves in the control circuits of the main valves shall be a minimum.

Another object of my invention is to eliminate at least one of the auxiliary valves in the control circuit of the main valves of a welding system having the features of timing and heat control.

A further object of my invention is to provide a welding system having the features of timing and heat control incorporating only a single auxiliary valve in the control circuit of each main valve.

A more general object of my invention is to provide apparatus for supplying current impulses of large magnitude for precisely predeterminable intervals of time and of precisely predeterminable magnitude in which the number of valves having a high current rating shall be a minimum.

Another general object of my invention is to provide simple and inexpensive apparatus for supplying current pulses during precisely predeterminable intervals of time and of precisely predeterminable magnitude.

An ancillary object of my invention is to provide apparatus of simple and inexpensive structure for supplying potential impulses for rendering a valve conductive at a precisely predeterminable time.

Another ancillary object of my invention is to provide simple and inexpensive apparatus for obtaining potentials of perpendicular wave front having particular utility in the control of electric discharge valves.

A further ancillary object of my invention is to provide apparatus for supplying power from a source to a load through a pair of electric discharge valves in which physical differences between the valves shall be compensated.

In accordance with my invention, only one auxiliary valve is used in the ignition or control circuit of each main valve and the timing and the heat control features are provided by controlling these auxiliary valves from at least two additional auxiliary valves connected in series. The latter auxiliary valves may have relatively small rating since they carry only small current. One of the latter valves is now controlled by the timing device and the other from the heat control phase shift network. The timing is attained by applying a continuous gradually decreasing potential to the control circuit of the valve involved, while the heat control is applied in the form of a series of discrete potential impulses, one impulse being applied for each periodic pulsation of the source at the instant in the pulsation at which it is desired that the corresponding main valve be rendered conducting.

The timing potential may be derived in a number of ways but is in accordance with the preferred practice of my invention obtained by charging a capacitor through a resistor of suitable magnitude. The heat control impulses are derived from a periodic source through a phase shift circuit of the usual structure.

The control potentials for the auxiliary valves which still remain in the control circuits of the main valves are in accordance with my invention of perpendicular wave front. The steep wave front potentials are obtained by connecting in series with the input impedance or the primary of the input transformer of the auxiliary valve associated with the main valve, a series transformer. A resistance of suitable magnitude is connected in parallel with the primary of the input transformer of the auxiliary valve. The series transformer is short circuited by the small auxiliary valves and when this occurs a potential is abruptly impressed across the resistor in parallel with the primary of the input transformer and therefore across the primary.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawings in which:

Figure 1 is a diagrammatic view showing a preferred embodiment of my invention;

Fig. 2 is a graph illustrating the operation of Fig. 1;

Figure 3:
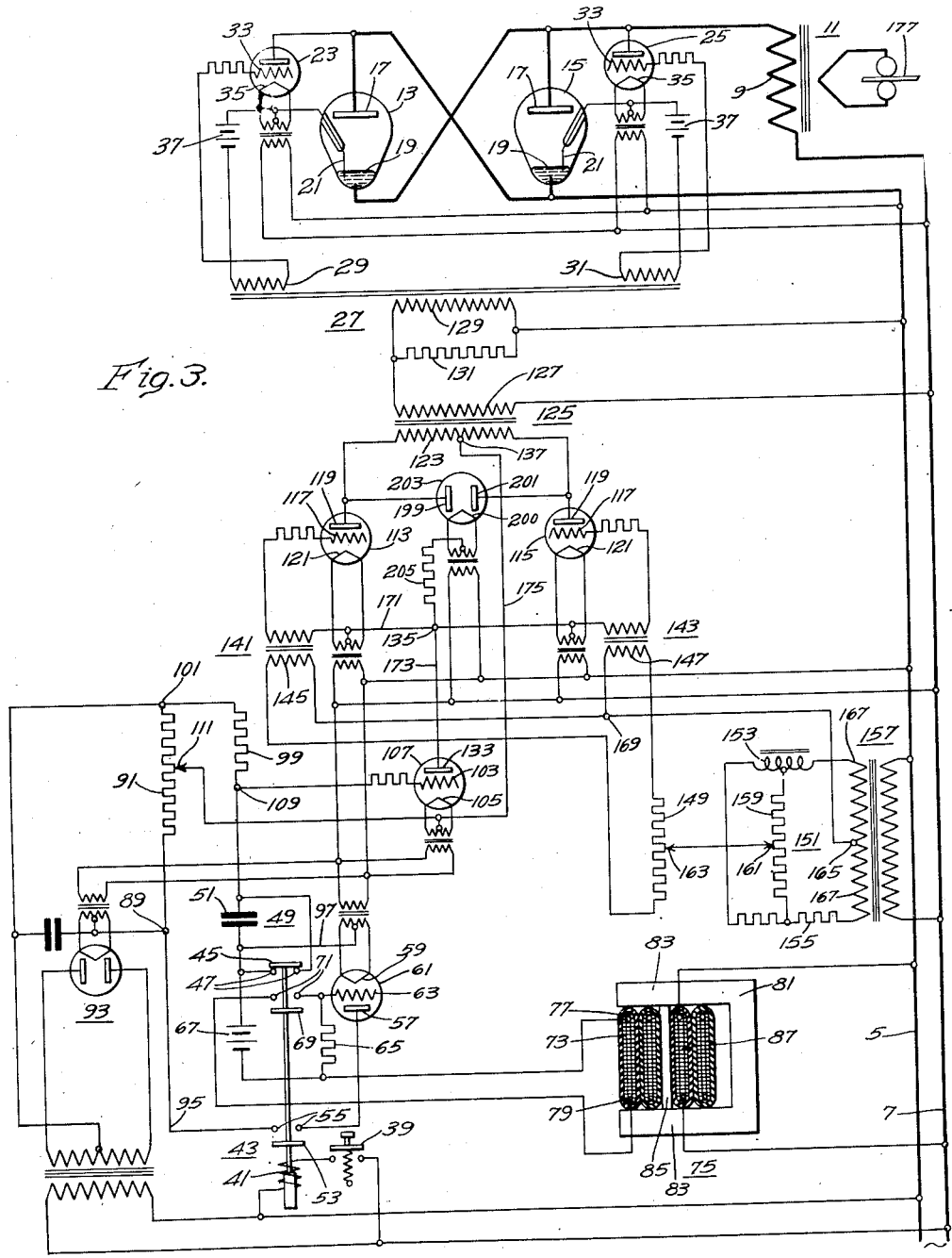
Fig. 3 is a diagrammatic view showing a modification of my invention.

The apparatus shown in Figure 1 comprises a pair of alternating current line conductors 5 and 7 which may be ordinary commercial supply conductors providing 60-cycle alternating current. The line conductors supply current to the primary 9 of a welding transformer 11 through a pair of main electric discharge devices 13 and 15 of the immersed-ignition-electrode type. Of course, the main discharge devices may also be of any other type such as hot cathode arc-like discharge devices. Each of the main discharge devices 13 and 15 is provided with an anode 17, a mercury pool cathode 19 and an ignition electrode 21.

Ignition current is provided for the main discharge devices from the main line conductors 5 and 7 through a pair of auxiliary discharge devices 23 and 25 which are specifically shown to be, and preferably are, of the hot cathode arc-like type. Each of the auxiliary devices comprises an anode, a hot cathode and a control electrode. The auxiliary devices 23 and 25 are normally non-conductive but are rendered conductive by potential impulses supplied from the main conductors 5 and 7 through a control transformer 27 having a pair of secondaries 29 and 31, one of which, 29, is connected between the control electrode 33 and the anode 35 of one of the auxiliary devices 23 through a suitable biasing source 37 and the other one, 31, is similarly connected to the other device 25.

To start the welding operation, a suitable starting switch 39 such as a push button or a foot pedal is closed. By the operation of the push button a circuit is closed through the exciting coil 41 of a starting relay 43 and the relay is energized. The upper movable contactor 45 of the relay disengages a pair of fixed contacts 47 to open a short circuit 49 across a capacitor 51. The lowest movable contactor 53 of the relay engages a pair of corresponding fixed contacts 55 and closes a charging circuit for the capacitor 51 through the anode 57 and the cathode 59 of an auxiliary discharge device 61.

The charging discharge device 61 is maintained non-conductive just after its anode cathode circuit is closed by the contactor 53 as its control electrode 63 is connected to its cathode 59 through a resistor 65 and a suitable biasing source 67. However, the central movable contactor 69 of the starting relay 43 engages a pair of fixed contacts 71 to close a circuit between the control electrode 63 and the cathode 59 which extends through the secondary 73 of a peaking transformer 75. The latter circuit shunts out the resistor 65 between the control electrode 63 and the cathode 59. It extends from the upper terminal 77 of the secondary 73 of the transformer 75 through the biasing battery 67, the cathode 59 of the charging device 61, the control electrode 63 of the device, the central contactor 69 of the starting relay 43 to the lower terminal 79 of the secondary.

The peaking transformer 75 is of a structure particularly adapted for the purpose for which it is used in the present instance. It is described in detail in my copending application, Serial No. 234,635, filed October 12, 1938, and assigned to the Westinghouse Electric & Manufacturing Company. For the present purpose it will be sufficient to say that the transformer comprises a soft-iron U-shaped core 81 which is preferably laminated. Between the cheeks 83 of the core a narrow bar 85 of a highly magnetizable metal, such as Hypernick, extends. The primary 87 of the transformer is preferably adjacent the Hypernick bar 85 and is composed of a relatively high resistant wire. The secondary 73 of the transformer is wound around the primary. The primary terminals are connected to the line conductors 5 and 7. The transformer is constructed by winding wire on an insulating tube in a mandrel to form the primary, then winding the wire for the secondary over the primary turns and finally removing the wound assembly from the mandrel and inserting the Hypernick bar 85 in the insulating tube. After this the bar and the windings are mounted in the core 81. Of course the relationship of the windings may be interchanged, the primary may be wound on the outside and the secondary on the inside.

By reason of the presence of the highly magnetizable bar 85 the potentials manifested between the terminals of the secondary of the transformer when a sinusoidal potential is impressed on the primary are of peaked wave form; that is to say, each potential impulse provided at the secondary has a substantial value only during an interval that is short compared to a half cycle of the source. Moreover, by reason of the ohmic resistance in the primary circuit of the transformer, the impulses of substantial magnitude occur early in the half periods of the potential impressed on the primary. In the transformers constructed in accordance with the teachings of the prior art, the impulse of substantial magnitude lags the zero point in the half cycle applied to the primary by 90°. In a transformer constructed as described above, the lag is no more than 20° and sometimes considerably less.

Accordingly, when the central contactor 69 of the starting relay 43 is closed, impulses of peaked wave form are impressed between the control electrode 63 and the cathode 59 of the charging device 61. The impulses are alternately of negative and positive polarity and of substantial magnitude. When the first impulse of positive polarity is impressed in the control circuit of the charging discharge device 61, the device is rendered conductive and current is transmitted through the charging circuit. The circuit extends from the positive terminal 89 of a voltage divider 91, supplied with direct current from the line conductors 5 and 7 through a suitable full wave rectifier 93, through a conductor 95, the lowest movable contactor 53 of the starting relay 43, the anode 57 and the cathode 59 of the charging device 61, a conductor 97, the capacitor 51, a resistor 99 in series with the capacitor, to the negative terminal 101 of the voltage divider. It is to be noted that since the impulses from the transformer 75 can only be supplied early in the half cycles of the potential of the line conductors 5 and 7, the charging of the capacitor 51 begins early in a half period of the source.

As the capacitor 51 charges a gradually decreasing current flows through the series resistor 99. The potential drop across the resistor is applied between the control electrode 103 and the cathode 105 of a timing discharge device 107 which may be of relatively small rating. The control electrode 103 of the timing device 107 is connected to the junction point 109 of the resistor 99 and the capacitor 51 while its cathode 105 is connected to the adjustable tap 111 of a voltage divider 91. Hence, in the absence of charging current through the resistor 99, the control electrode of the timing device is at the potential of the negative terminal 101 of the divider 91, while the cathode is at the more positive potential of the adjustable tap 111. When the capacitor 51 is charging the potential drop across the resistor 99 renders the control electrode 103 more positive than the cathode 105 at least during a portion of the charging time.

The timing device 107 is connected in series with a pair of heat control discharge devices 113 and 115, each of which may also be of relatively small rating. The heat control devices are of the arc-like discharge type, each having a control electrode 117, an anode 119 and a cathode 121. The anodes 119 of the heat control devices 113 and 115 are connected to the terminals of the secondary 123 of a transformer 125. The primary 127 of the transformer 125 is connected in series with the primary 129 of the control transformer 27 through which the auxiliary devices 23 and 25 in the control circuits of the main devices 13 and 15 are supplied, and a resistor 131 of moderate magnitude is connected in parallel with the latter primary 129. The primaries 127 and 129 are supplied in series from the main line conductors 5 and 7.

The cathodes 121 of the heat control devices 113 and 115 are connected together and the anode 133 of the timing device is connected to the common connection point 135 of the cathodes 121. The cathode 105 of the timing device 107 is connected to the intermediate tap 137 of the secondary 123 of the transformer 125 to which the anodes 119 of the heat control devices 113 and 115 are connected. The potential of the source 5, 7 is thus applied to the series circuit of either of the two heat control devices 113 and 115 and the timing device 107. Since initially the heat control devices 113 and 115 are non-conductive, the timing device is at this point also non-conductive, although its control potential is of sufficient magnitude to render it conductive.

Control potential is supplied to the heat control devices 113 and 115 through separate transformers 141 and 143. One terminal of a primary 145 of one of the transformers is connected directly to a corresponding terminal of the primary 147 of the other, while the remaining terminals are connected to each other through a suitable resistor 149. Potential is supplied to the transformers 141 and 143 from a phase shift network 151 of the usual structure comprising a reactance 153 and an ohmic resistance 155 connected in series with each other and supplied from the main source 5, 7 through still another transformer 157. As is the usual practice, a voltage divider 159 is connected between intermediate terminals of the reactor 153 and the resistor 155 and the adjustable tap 161 of the voltage divider is connected to the adjustable tap 163 of the resistance 149 connected between the primaries 145 and 147. The intermediate terminal 165 of the secondary 167 of the transformer 157, whereby the phase shift network 151 is supplied is connected to the junction point 169 of the directly connected terminals of the primaries 145 and 147. By moving the adjustable tap 161 of the voltage divider 159, the phase of the potential impressed on the primaries 145 and 147 relative to the potential waves of the main source 5, 7 may be suitably adjusted. By adjusting the movable tap 163 of the resistor 149, the instants at which the valves 113 and 115 are rendered conductive in their respective half periods may be relatively adjusted.

Accordingly, potential half waves having any desired phase position are impressed between the control electrodes 117 and the cathodes 121 of the heat control devices 113 and 115. The potentials are of such magnitude that the heat control devices may be rendered conductive if the potential supplied through the transformer 125 to the secondary 123 of which their anodes 119 are connected. Since the timing device 107 is also supplied with sufficient control potential to render it conductive, one or the other of the heat control devices 113 or 115 and the series connected timing device are now simultaneously rendered conductive at instants selected in accordance with the setting of the phase shift network, and current flows through the discharge devices. The circuit for the left-hand heat control device 113 extends from the intermediate tap 137 of the secondary 123 through the left-hand winding of the secondary, the left-hand heat control device 113, a conductor 171, a conductor 173, the timing device 107, a conductor 175 to the intermediate tap 137. A similar circuit may be traced for the other heat control device 115.

During the time that the control electrode 103 of the timing device 107 is at a potential relative to the cathode 105 such that the timing device may be rendered conductive, current is thus supplied through the heat control devices 113 and 115 during alternate half cycles and during this time the secondary 123 of the transformer 125 through which the heat control and timing devices are supplied is in part short-circuited at predetermined instants in the corresponding half periods. At the instant that the short-circuit occurs potentials are abruptly supplied through the control transformer 27 to the control circuits of the auxiliary devices 23 and 25 in the ignition circuits of the main devices 13 and 15. The auxiliary devices 23 and 25 are, therefore, rendered conductive at instants pre-set by the phase shift network 151 during the half periods during which the timing and heat control devices are conductive, and for intervals beginning at these instants current flows through the main devices 13 and 15 and the primary 9 of the welding transformer 11 and through the material 177 to be welded. Any non-uniformity, such as difference in arc drop or promptness of ignition which exists in the main valves 13 and 15 or their ancillary circuits is compensated by the proper adjustment of the variable tap 163 of the resistor 149.

Since the timing device 107 is connected in series with the heat control devices 113 and 115 to the source 5, 7, it is essential that both the timing device and either one of the heat control devices be capable of conducting current, and therefore, the discharge devices pass current only so long as the charging current for the capacitor 51 is sufficient to neutralize the bias potential provided by the voltage divider 91 and to render the timing device 107 conductive. The time required for charging the capacitor 51 thus determines the time during which the heat control devices 113 and 115 and the series connected timing device are capable of conducting at all and, therefore, the time during which welding current may flow. On the other hand, the heat control devices prevent conduction until the instant pre-set by the phase shift network 151, and thus they determine the amount of current which may flow and therefore the amount of heat supplied by the current for welding. It is to be noted that in accordance with my invention, only one timing device of small rating and two heat control devices, also of small rating, are necessary. The three small devices replace at least two heat control devices of large rating required in accordance with the teaching of the prior art.

The application of starting pulses to the charging device 61 early in the half periods of the supply source 5, 7 is essential for the proper operation of my invention because it is important to make certain that the welding current should flow during every half period of the selected number of half periods. This would not be the case if the starting pulse for the charging device 61 were applied later in the selected half period of the source. In such a case it would often happen that the starting pulse for the charging device is applied at a later phase point than that at which the impulse supplied during the same half period by the phase shift network 151 to the heat control devices rises to a sufficient value to render one of the latter devices conductive. In such an event, current flow through the welding load would be initiated during the first half period later than during the other half periods and an unbalance would be produced.

The relationship between the potentials supplied to control the main discharge devices 13 and 15 is graphically illustrated in Fig. 2. The heavy sine wave 179 represents the potential supplied by the main source 5, 7 to the series network of the primaries 127 and 129 of the two transformers 125 and 27, respectively. The sine curves 181 and 183, partially in light full lines 185 and 187 and partially in light broken lines 189 and 191, represent the potentials supplied to the individual primaries 127 and 129, respectively, as a function of time when the heat control discharge devices 113 and 115 are non-conductive. The lower curve 183 represents the potential impressed across the resistor 131 and therefore across the primary 129. The upper curve 181 represents the potential impressed across the primary 127. The vector sum of the ordinates of the two curves is at every point equal to the ordinate of the heavy curve. It is to be noted that since secondaries 29 and 31 of transformer 27 are open just as the secondary 123 of transformer 125, the resistor 137 shunting the primary 129 of the former must be of such magnitude that its impedance is small compared to the impedance of transformer 125. Otherwise a substantial portion of the potential of source 5, 7 will be absorbed across the resistor and a relatively large potential will be impressed in the control circuits of auxiliary valves 23 and 25. Under such circumstances, the latter valves would tend to become prematurely conductive.

What occurs when the heat control devices 113 and 115 and the timing device 107 are conductive is graphically illustrated by the curve 193 drawn in very heavy lines and the curve 195 in very light lines. When the secondary 123 of the transformer 125 supplying the heat control devices 113 and 115 is short circuited by the devices, a greater portion of the total potential from the source 5, 7 is abruptly transferred to the terminals of the resistor 131 and therefore to the terminals of the primary 129 of the other transformer 27. This is represented by the upper curve 193. The heavy vertical portion line 197 of the curve 193 arising from the lower light curve 183 represents the abrupt rise in the potential impressed across the control transformer 27 which occurs. As seen the potential rises from the small value of curve 108 to the large value at the upper terminal of the vertical line 197. The same vertical line 197 from the upper light curve 181 to the lower very light curve 195 represents the drop which occurs in the potential impressed across the primary of the other transformer 125 when the heat control devices 113 and 115 and the timing device 107 are conductive. What happens during one half cycle of the source 5, 7 of course also happens during the subsequent one which is of opposite polarity as shown in Fig. 2. The secondaries 29 and 31 are so connected that both half cycles are properly utilized. It is seen that the curves 183 and 193 representing the potential impressed on the primary 129 of the control transformer 27 and, therefore, the potentials in the control circuits of the auxiliary devices 23 and 25 of perpendicular wave front and therefore, the control potentials for the auxiliary devices have a similar wave front and the auxiliary devices are energized precisely at the desired instants.

An analysis of the Fig. 1 apparatus will reveal that it may happen at times that the welding current may not flow during the last half cycle of a number of half cycles for which the apparatus is set. This may occur, for example, if the charging current through the resistor 99 in series with the capacitor 51 falls to too low a value to maintain the conductivity of the timing device 107 early in the last desired conductive half period of the source 5, 7. The timing device remains non-conductive until the heat control devices 113 and 115 are rendered conductive and the potential supplied from the phase shift network 151 to the heat control devices may rise to a value above the critical potential of the heat control devices later in the last half period than the instant at which the potential supplied by the resistor falls below the necessary value. It may happen, therefore, that the possibility of rendering the timing device 107 conductive shall have ceased when the possibility of rendering a heat control device 113 or 115 conductive arises. In such an event the necessary short circuiting of the transformer 125 does not occur during the last half period and, therefore, the main devices fail to pass current to the welding load during this half period. This situation does not happen very often and therefore the system shown in Fig. 1 is satisfactory for the common run of welding loads. However, sometimes greater perfection in the welds is required and where this is the case the apparatus shown in Fig. 3 is found to be satisfactory.

In the Fig. 3 apparatus, the timing discharge device 107 is connected to the terminals of the secondary 123 whereby the heat control and timing devices 113, 115 and 107 are supplied through the branches 199—200, and 201—200 of a full wave rectifier 203, or through separate rectifiers, and through a resistor 205. The anodes 199 and 201 of the full wave rectifier 201 are connected to the anodes 119 of the heat control devices 113 and 115 and the cathode 200 is connected to the anode 133 of the timing device 107 through the resistor 205. When energizing potential is now supplied to the timing device during any point in any half period of the source 5, 7, the timing device is rendered conductive and current flows from the secondary of the transformer through the rectifier 203 and the resistor 205. The resistor 205 is of such magnitude that the current flow is so small that for all practical purposes the transformer 125 supplying the current flow may be regarded as still open circuited. Since the timing device 107 is of the arc-like discharge type, it remains conductive during the remainder of the half period during which it is rendered conductive when once rendered conductive. Accordingly, if it should happen that the potential supplied through the resistor 99 in series with the capacitor 51 is sufficient to render the timing device conductive early in the last of a series of half periods and then immediately falls below that value sufficient for conductivity, the timing device 107 will remain conductive and, therefore, when subsequently the energizing potential is supplied to one or the other of the heat control devices 113 or 115 conduction through the heat control devices and the timing device takes place and the transformer is short circuited in the usual manner.

Figure 4:
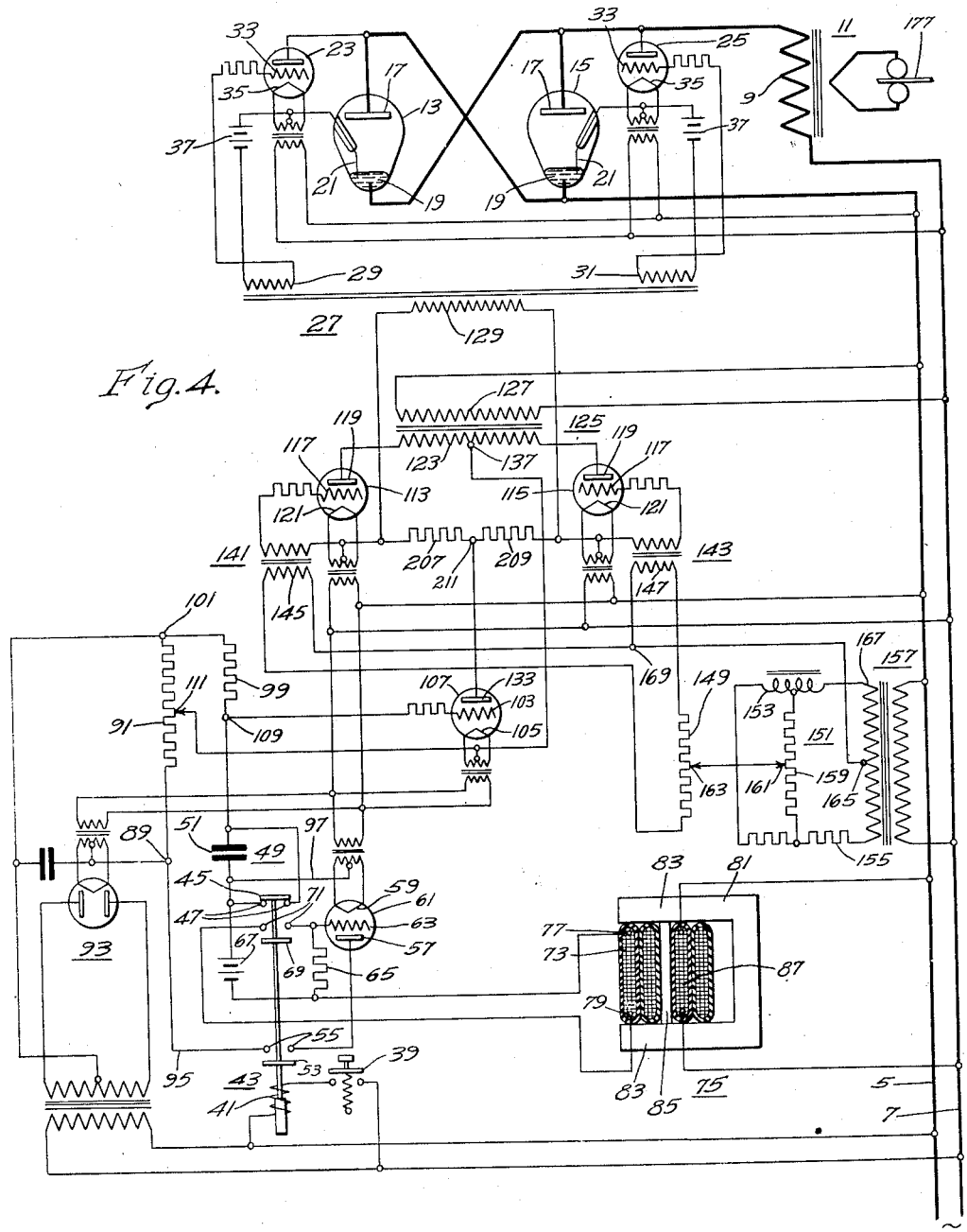
Fig. 4 is a diagrammatic view showing still another modification of my invention.

The apparatus shown in Fig. 4 is a modification of the Fig. 1 system. In this case resistors 207 and 209 are connected between the cathodes 121 of the heat control discharge devices 113 and 115 and the anode 133 of the timing device 107 is connected to the intermediate terminal 211 with which the resistor is provided. The resistors are connected directly across the primary 129 of the control transformer 27 in lieu of the resistor 131 in the other modifications. However, the primary 129 is not connected to the source through the primary 127 of transformer 125 in this case; the primary 127 alone is connected across the source.

In this arrangement, the potential drop across the resistors 207 or 209 is the potential impressed on the transformer 27 and therefore in the control circuits of the auxiliary devices 23 and 25. Accordingly, when the heat control devices 113 and 115 and the timing device 107 are non-conductive, the potential impressed on the control transformer 27 is zero. When the heat control and timing devices are conductive, the potential drop produced by the current flow is impressed on the control transformer 27 and the devices 23 and 25 are rendered conductive. As the conductivity of the heat control and timing devices is initiated at selected points in the half periods of the sources 5 and 7, the devices 23 and 25 and the main devices 13 and 15 are rendered conductive at the selected points in the half periods. Of course, as in the other modifications, the main valves 13 and 15 may be rendered conductive at different points in the half periods to compensate for differences in their structure and operation.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in controlling the current flow from a source of periodically pulsating current the combination comprising electric valve means connected to said source and said load, means for continuously impressing a potential for a predetermined interval of time for rendering said valve means conductive during a predetermined number of pulsations of said source corresponding to said interval, said potential impressing means comprising a capacitor, and means for charging said capacitor, and means for impressing impulses on said valve means to render said valve means conductive at predetermined points in each of the said predetermined number of pulsations, said valve means comprising at least two groups of electric discharge devices and said source having a pair of terminal taps and an intermediate tap, one of said groups including a pair of asymmetrically conductive electric discharge devices of the arc-like discharge type, each device having a plurality of principal electrodes, a principal electrode of each of said pair of discharge devices being connected to a terminal tap and another principal electrode of one of said pair of devices being connected to a corresponding principal electrode of the other, the other group including a single discharge device having principal electrodes connected between said intermediate tap and the connection point of said connected principal electrodes of said pair of discharge devices and said impulses being impressed on said first mentioned group of discharge devices and said potential being impressed on the discharge device of said last-named group, and asymmetrically conductive means having a high impedance compared to that of said asymmetrically conductive devices by-passing each of said asymmetrically conductive devices.

2. For using in supplying a load from a source of periodically pulsating current the combination of periodically pulsating current comprising electric valve means interposed between said source and said load, said valve means comprising a plurality of main electric dischar devices, each having a control circuit, including an auxiliary discharge device, means for impressing potentials for a predetermined interval of time on said auxiliary discharge devices for rendering said valve means conductive during a predetermined number of pulsations of said source corresponding to said interval, said potential impressing means comprising at least two additional electric discharge devices each having a control electrode and a plurality of principal electrodes, the principal electrodes of said last named discharge devices being connected in series with each other, means, including a capacitor and means for charging said capacitor, for continuously impressing a potential during said interval between the control electrode and a principal electrode of one of said discharge devices, and means for impressing impulses between a control electrode and a principal electrode of the other of said last-named discharge devices to render said other discharge device conductive at predetermined instants in said predetermined number of pulsations.

3. For use in supplying a load from a source of periodically pulsating current the combination comprising electric valve means interposed between said source and said load, auxiliary electric discharge means to be rendered conductive by the simultaneous application of a continuous potential and an impulse potential and when so rendered conductive to control said valve means, means, including a capacitor and means for charging said capacitor, for impressing said continuous potential on said auxiliary discharge means during predetermined pulsations of said source, said impressing means also including means insuring that the impressing of said continuous potential begins near the beginning of the first of said predetermined pulsations of said source, and means for impressing said impulse potential on said auxiliary discharge means during the time that said potential is impressed thereon to render said valve means conductive at predetermined instants in said pulsations.

4. For use in supplying a load from a source of periodically pulsating current the combination comprising electric valve means interposed between said source and said load, auxiliary electric discharge means to be rendered conductive by the simultaneous application of a continuous potential and an impulse potential and when so rendered conductive to control said valve means, means, including a capacitor and means for charging said capacitor, for impressing said continuous potential on said auxiliary discharge means during predetermined pulsations of said source, said impressing means also including means insuring that the impressing of said continuous potential begins near the beginning of the first of said predetermined pulsations of said source, and means for impressing said impulse potential on said auxiliary discharge means during the time that said potential is impressed thereon to render said valve means conductive at predetermined instants in said pulsations, the first of said potential impulses being impressed to render said auxiliary discharge means conductive at an instant in the first of said predetermined pulsations that is later than the instant at which the impressing of said potential begins.

5. For use in supplying a load from a source of periodically pulsating current the combination comprising electric valve means interposed between said source and said load, said valve means comprising a plurality of main electric discharge devices, each having a control circuit, including an auxiliary discharge device, means for impressing potentials for a predetermined interval of time on said auxiliary discharge devices for rendering said valve means conductive during a predetermined number of pulsations of said source corresponding to said interval, said potential impressing means comprising at least two additional electric discharge devices each having a control electrode and a plurality of principal electrodes, the principal electrodes of said last named discharge devices being connected in series with each other, means, including a capacitor and means for charging on said capacitor, for continuously impressing a potential during said interval between the control electrode and a principal electrode of one of said discharge devices, and means for impressing impulses between a control electrode and a principal electrode of the other of said last-named discharge devices to render said other discharge device conductive at predetermined instants in said predetermined number of pulsations, and means for assuring that said valve means is rendered conductive during the last of said pulsations regardless of how late in said pulsations the corresponding impulses are impressed.

6. For use in supplying a load from a source of periodically pulsating current the combination comprising electric valve means interposed between said source and said load, said valve means comprising a plurality of main arc discharge devices each having an ignition circuit, means for impressing potentials for a predetermined interval of time in said auxiliary ignition circuits for rendering said valve means conductive during a predetermined number of pulsations of said source corresponding to said interval, said potential impressing means comprising at least two groups of auxiliary electric discharge devices, an auxiliary source having a pair of terminal taps and an intermediate tap, one of said groups including a pair of electric discharge devices each device having a plurality of principal electrodes, a principal electrode of each of said pair of discharge devices being connected to a terminal tap and another principal electrode of one of said pair of devices being connected to a corresponding principal electrode of the other, the other group including a single discharge device having principal electrodes connected between said intermediate tap and the connection point of said connected principal electrodes of said pair of discharge devices, means for impressing impulse potentials on said first mentioned group of discharge devices and means including a capacitor and means for charging said capacitor, for impressing potential continuously during said interval on the discharge device of said last-named group, said devices of said groups being rendered conductive when said impulse potential and said continuous potential are impressed.

7. For use in supplying a load from a source of periodically pulsating current the combination comprising electric valve means interposed between said source and said load, said valve means comprising a plurality of main electric discharge devices, each having a control circuit including an auxiliary discharge device, means for impressing potentials for a predetermined interval of time on said auxiliary discharge devices for rendering said valve means conductive during a predetermined number of pulsations of said source corresponding to said interval, said potential impressing means comprising at least two additional electric discharge devices each having a control electrode and a plurality of principal electrodes, the principal electrodes of said last named discharge devices being connected in series with each other, means for continuously impressing a potential during said interval between the control electrode and a principal electrode of one of said discharge devices, and means for impressing impulses between a control electrode and a principal electrode of the other of said last-named discharge devices to render said other discharge device conductive at predetermined instants in said predetermined number of pulsations, and high impedance means for by-passing said other discharge device.

8. For use in supplying a load from a source of periodically pulsating current the combination comprising electric valve means interposed between said source and said load, said valve means comprising a plurality of main electric discharge devices, each having a control circuit including an auxiliary discharge device, means for impressing potentials for a predetermined interval of time on said auxiliary discharge devices for rendering said valve means conductive during a predetermined number of pulsations of said source corresponding to said interval, said potential impressing means comprising at least two additional electric discharge devices each having a control electrode and a plurality of principal electrodes, the principal electrodes of said last named discharge devices being connected in series with each other and one of said devices being asymmetrically conductive, means for continuously impressing a potential during said interval between the control electrode and a principal electrode of said other of said discharge devices, and means for impressing impulses between a control electrode and a principal electrode of one of said discharge devices to render said discharge device conductive at predetermined instants in said predetermined number of pulsations, and asymmetrically conductive means having a high impedance compared to the impedance of said asymmetrically conductive discharge device for by-passing said asymmetrically conductive devices.

9. For use in supplying a load from a source of periodically pulsating current the combination comprising electric valve means interposed between said source and said load, said valve means comprising a plurality of main electric discharge devices, each having a control circuit including auxiliary discharge devices, means including a capacitor and means for charging said capacitor, for impressing a potential on one of said auxiliary discharge devices for rendering said auxiliary discharge devices conductive during predetermined pulsations of said source and means for impressing impulses on others of said auxiliary discharge devices during the time that said potential is impressed on said one device to render said auxiliary discharge devices conductive at predetermined instants in said pulsations, thereby to render said valve means conductive at said predetermined instants, and means including a rectifier and an impedance for assuring that said auxiliary discharge devices are rendered conductive during the last of said pulsations regardless of how late in said pulsation the corresponding impulse is impressed thereby assuring that said valve means is rendered conductive during said last pulsation.

JOHN W. DAWSON.